US011416929B2

(12) United States Patent
Haller

(10) Patent No.: US 11,416,929 B2
(45) Date of Patent: Aug. 16, 2022

(54) PAIRS TRADING SYSTEM AND METHOD

(71) Applicant: NYSE Group, Inc., New York, NY (US)

(72) Inventor: Thomas F. Haller, Longwood, FL (US)

(73) Assignee: NYSE Group, Inc., New York, NY (US)

( * ) Notice: Subject to any disclaimer, the term of this patent is extended or adjusted under 35 U.S.C. 154(b) by 58 days.

(21) Appl. No.: 14/548,908

(22) Filed: Nov. 20, 2014

(65) Prior Publication Data
US 2015/0081513 A1 Mar. 19, 2015

Related U.S. Application Data

(63) Continuation of application No. 14/191,152, filed on Feb. 26, 2014.

(60) Provisional application No. 61/779,899, filed on Mar. 13, 2013.

(51) Int. Cl.
*G06Q 40/04* (2012.01)
(52) U.S. Cl.
CPC ................... *G06Q 40/04* (2013.01)
(58) Field of Classification Search
CPC ......... G06Q 40/04; G06Q 40/00; G06Q 40/06
USPC .......................................................... 705/37
See application file for complete search history.

(56) References Cited

U.S. PATENT DOCUMENTS

| | | | |
|---|---|---|---|
| 6,035,287 A | 3/2000 | Stallaert et al. | |
| 6,347,307 B1 | 2/2002 | Sandhu et al. | |
| 7,231,363 B1 | 6/2007 | Hughes et al. | |
| 7,412,415 B2* | 8/2008 | Waddell | 705/37 |
| 8,341,059 B1 | 12/2012 | Rubio | |
| 2001/0044770 A1 | 11/2001 | Keith | |
| 2003/0101129 A1 | 5/2003 | Waddell et al. | |
| 2004/0254804 A1 | 12/2004 | Peterffy et al. | |
| 2004/0267655 A1 | 12/2004 | Davidowitz et al. | |
| 2006/0089899 A1 | 4/2006 | Durkin et al. | |
| 2007/0005484 A1 | 1/2007 | Waelbroeck et al. | |
| 2009/0271308 A1 | 10/2009 | Maynard | |
| 2009/0292649 A1 | 11/2009 | Somech et al. | |
| 2010/0017323 A1 | 1/2010 | Zimmerman | |
| 2010/0274702 A1 | 10/2010 | Tzroya | |
| 2011/0040669 A1 | 2/2011 | Lee et al. | |
| 2011/0145126 A1 | 6/2011 | Rooney | |
| 2011/0238555 A1 | 9/2011 | Rosenthal | |
| 2013/0006827 A1 | 1/2013 | Kaus | |

OTHER PUBLICATIONS

Pierre Vadim Carlo Di Pierto; Essays in Empirical Asset Pricing: A Dissertation, Northwestern University, Dec. 2007.
Securities and Exchange Commission by Chicago Board Options Exchange; Jul. 12, 2006; p. 1-13; www.sec.gov/rules/sro/cboe/2006/34-54135.pdf (Year: 2006).
Investopedia, "*What Was the First Company to Issue Stock?*", Mar. 8, 2009, https://web.archive.org/web/20090308083918/https://www.investopedia.com/ask/answers/08/first-company-issue-stock-dutch-east-india.asp/; (Year: 2009).

(Continued)

*Primary Examiner* — Joseph W. King
(74) *Attorney, Agent, or Firm* — DLA Piper LLP (US)

(57) ABSTRACT

A trading platform adapted for pairs trading of unrelated securities from one or more asset classes using a single order approach is provided.

6 Claims, 4 Drawing Sheets

(56) References Cited

OTHER PUBLICATIONS

Wikipedia, "*Jonathan's Coffee-House*," Nov. 28, 2007. https://web.archive.org/web/20071128110742/http//en.wikipedia.org/wiki/Jonathan%27s_Coffee-House. (Year: 2007).
Broel-Plater, "*A Wider Perspective on Pairs Trading,*" Department of Economics, School of Economics and Management Lund University, Sweden, May 26, 2010, https://pdfs.semanticscholar.org/039077d2c971d339ebf86df00082ae7aad661674.pdf. (Year: 2016).
Wang, "A High Performance Pair Trading Application," 2009 IEEE International Symposium on Parallel & Distributed Processing, pp. 1-8, May 2009, (Year: 2009).
Bianchi, Robert J., et al., "*Pairs Trading Profits Commodity Future Markets*," Jan. 2009, 17 pages.
Securities and Exchange Commission (Release No. 34-67827; File No. SR-CBOE-2012-085), Sep. 11, 2012, pp. 1-7.
Pasquariello et al., "Strategic Cross-Trading in the US Stock Market," Review of Finance (2015) 19: pp. 229-282, Dec. 24, 2013.
Kocherlakota, et al., "Household Heterogeneity and Asset Trade: Resolving the Equity Premium Puzzle in Three Countries," 47 pages, Jan. 2008.
Pasquariello, Paolo, "Imperfect Competition, Information Heterogeneity, and Financial Contagion," 56 pages, Jan. 13, 2003.
George P. Gao, et al., "Institutional Ownership and Return Predictability Across Economically Unrelated Stocks," Jul. 13, 2012; 67 pages.

\* cited by examiner

PAIRS TRADING SYSTEM AND METHOD

TECHNICAL FIELD

Embodiments of the disclosure relate generally to financial trading systems and, more specifically, to a pairs trading system and method.

BACKGROUND

Pairs trading is a strategy used by a trader to generate a return on investment by predicting a spread between two related securities, typically in the same sector, that tend to move together, wherein the trader takes a long position and a short position on the two related securities in the pair.

Traditionally, pairs trading is conducted among securities in the same market or, when dealing with options, using the same underlying security. However, there is presently no trading system that provides for pair trading of unrelated securities from different asset classes. Thus, traders wanting to trade unrelated securities, possibly across different asset classes, may only do so by submitting separate orders for each of the unrelated securities with the hope of executing both orders at the target parameters in the time period desired. Unfortunately, the separate order approach for conducting a pairs trade exposes traders to inherent leg risks and liquidity fragmentation.

Accordingly, there is a need for a trading platform adapted for pairs trading of unrelated securities from one or more asset classes using a single price movement provided by a single order approach.

SUMMARY

The present disclosure provides computer-implemented methods and systems for conducing pairs trades. In one exemplary embodiment, a computer-implemented method according to the present disclosure may include presenting a plurality of predefined pairs of unrelated articles, receiving a selection of a predefined pair from the predefined pairs for a pairs trade order, entering the pairs trade order as a single order in an order book, determining whether order parameters associated with a first leg and a second leg of the predefined pair have been met, and then executing the pairs trade order when the order parameters associated with said first and second legs are both met.

In another exemplary embodiment, a computer-implemented method according to the present disclosure may include receiving a request to pair at least two legs of unrelated securities, each associated with a different asset class, identifying a first security from a first asset class associated with a first leg, identifying a second security from a second asset class associated with a second let, determining whether the first and second legs form a tradable pair, and creating the requested pair of unrelated securities, where the requested pair is represented by a unique identifier.

An exemplary system according to the present disclosure may include a memory component and a processing component configured to execute and implement the various processing steps and features described above and throughout this disclosure.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
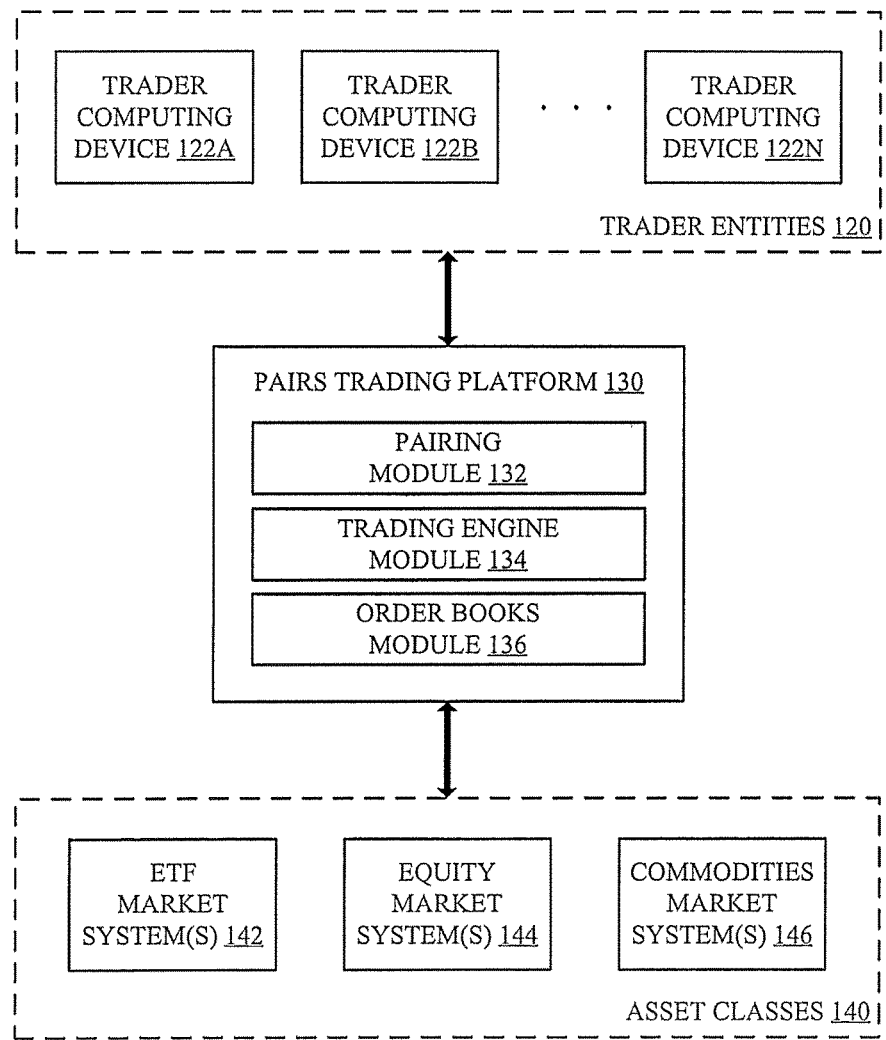
FIG. 1 is a block diagram illustrating an exemplary computer network in which embodiments of the present disclosure may operate.

Embodiments of the disclosure provide a system and methods for conducting cash equities pairs trading.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "creating", "presenting", "selecting", "routing", "matching", "executing", "filling", "canceling", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary computer network 100 in which embodiments of the present disclosure may operate. Referring to FIG. 1, computer network 100 may be comprised of a pairs trading platform 130, a plurality of trader computing devices 122A-122N adapted to conduct trades, which may be collectively referred to herein as trading entities 120, and market systems associated with regulating trading of a plurality of asset classes such as ETFs 142, equities 144, commodities 146 or any other suitable asset class, all of which may be collectively referred to herein as asset classes 140. In one embodiment, the computing devices of trading entities 120 and the market systems of asset classes 140 may be communicatively coupled to one or more networks (not shown) for transmitting and receiving trading-related data. Networks may be a private network (e.g., a local area network (LAN), wide area network (WAN), intranet, etc.) or a public network (e.g., the Internet).

Pairs trading platform 130 may be comprised of one or more modules configured to enable and process orders relating to request for pairs trades received from trader entities 120. For example, pairs trading platform 130 may be comprised of a pairing module 132 and a trading engine module 134, order books module 136. Pairing module 132 may be configured to manage all aspects of creating and making available pre-defined pairs of unrelated securities for selection and trading by trader entities 120. Trading engine module 134 may be configured to manage all aspects of routing and matching pairs trading orders received from trader entities 120. Order books module 136 may be configured to manage all aspects of identifying and communicating with order books associated with the legs representing each of the securities in the pairs trade order received from trader entities 120.

Figure 2:
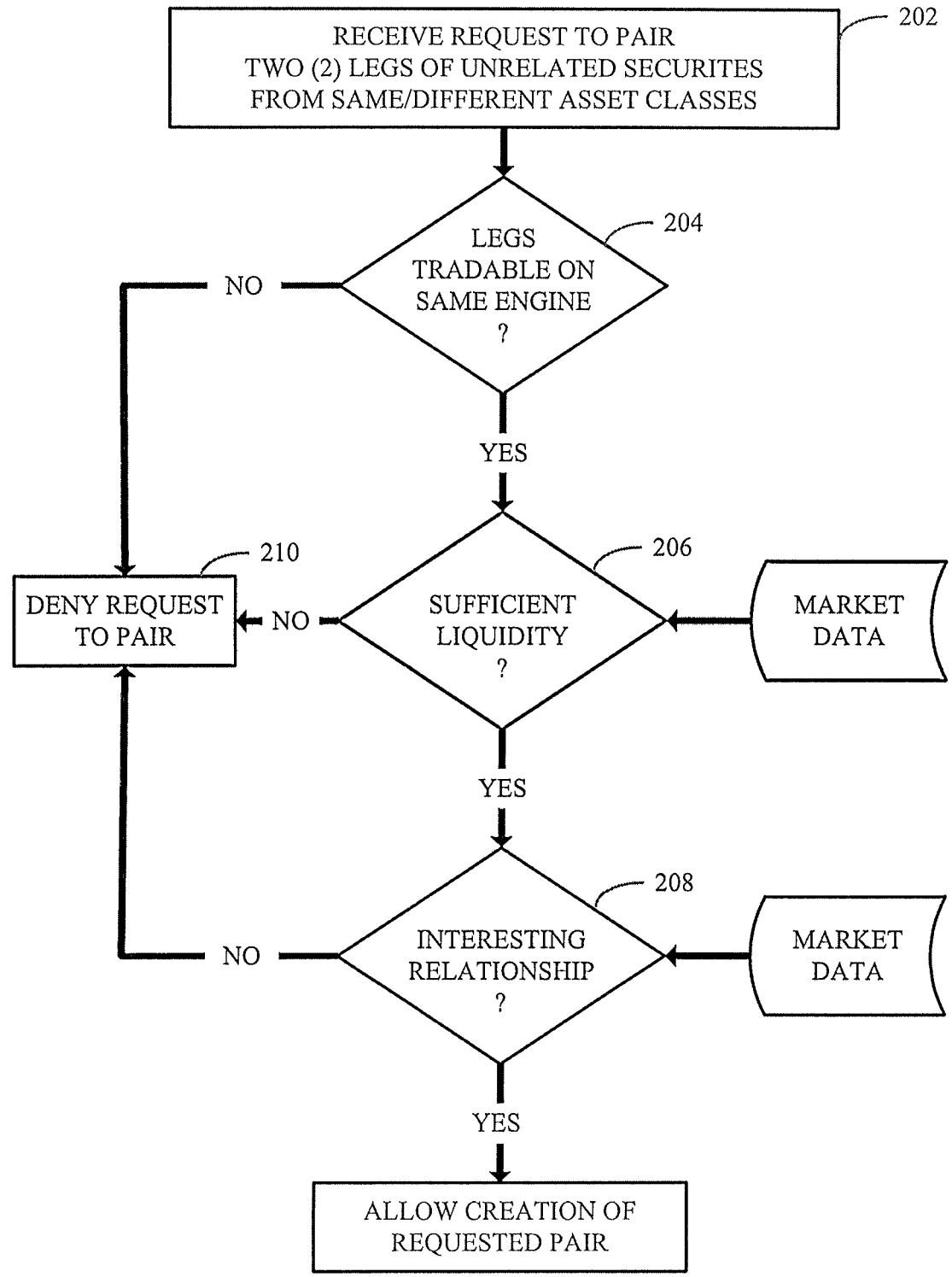
FIG. 2 is a flow diagram illustrating an embodiment of a method for pairing unrelated securities from one or more asset classes.
Figure 3:
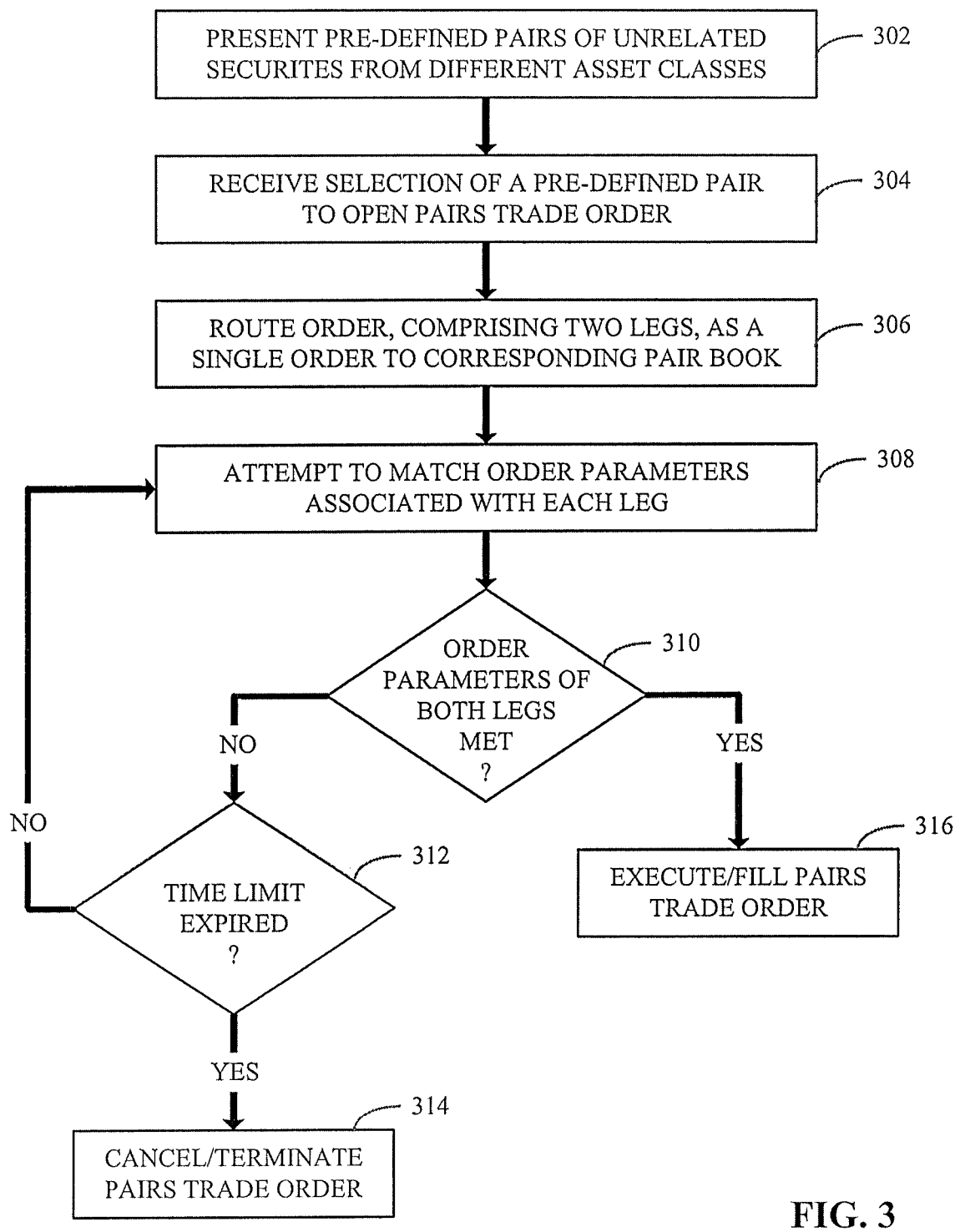
FIG. 3 is a flow diagram illustrating an embodiment of a method for trading pairs of unrelated securities from one or more asset classes.

Those skilled in the art will appreciate that pairs trading platform 130 may be configured with more or less modules to conduct the pairs trading methods described herein with reference to FIGS. 2 and 3. As illustrated in FIGS. 2 and 3, each of corresponding methods 200 and 300 may be performed by processing logic that may comprise hardware (e.g., circuitry, dedicated logic, programmable logic, microcode, etc.), software (such as instructions run on a processing device), or a combination thereof. In one embodiment, methods 200 and 300 may be performed by one or more processing components associated with modules 132, 134 and 136 of pairs trading platform 130.

FIG. 2 is a flow diagram illustrating a method 200 for pairing unrelated securities from one or more asset classes, according to an embodiment of the disclosure. Referring to FIG. 2, method 200 may be initiated upon receiving, at step 202, a request to pair two legs of unrelated securities from different asset classes. For example, a request may comprise pairing of Apple (AAPL) stock and Technology Select Sector SPDR (XLK), two unrelated securities from different asset classes (i.e., an equity and an ETF). In another embodiment, two legs of unrelated securities from the same asset class may also be paired. For example, a request may comprise pairing of SPDR Gold Shares (GLD) and SPDR S&P 500 (SPY), two unrelated securities from a related asset class (i.e., ETFs).

Upon receiving a request to pair unrelated securities, an initial determination may be made, at step 204, to ascertain whether legs representative of each of the securities in the requested pairing may be traded together. For example, pairing module 132 may check whether trading engine module 134 is configured to accommodate both legs of the unrelated securities identified in the requested pairing. If an affirmative determination is made at step 204, then a second determination may be made, at step 206, to ascertain whether sufficient liquidity is present in connection with each of die unrelated securities to accommodate the requested pairing. If an affirmative determination is made at step 206, then a third determination may be made, at step 208, to ascertain whether an interesting relationship (e.g., criteria defining investor demand levels, trading patterns between the unrelated securities or any other applicable measure) exists between each of the unrelated securities to accommodate the requested pairing. Determinations relating to the presence of sufficient liquidity and an interesting relationship may be based on market-driven data received, for example, by pairs trading module 130.

When an affirmative determination is made at steps 204, 206 and 208, then the requested pairing of unrelated securities may be created, at step 210, and made available for selection by trader entities 120. However, if one or more of the determinations made at steps 204, 206 and 208 are not affirmed, then pairing module 132 may be configured to deny, at step 212, the requesting pairing.

FIG. 3 is a flow diagram illustrating a method 300 for trading pairs of unrelated securities from one or more asset classes, according to an embodiment of the disclosure. Referring to FIG. 3, method 300 may be initiated upon presenting, at step 302, predefined pairs of unrelated securities from one or more asset classes. Selection of a predefined pair may be received, at step 304, to open a pairs trade order. For example, trading entities 120 may search and select from a listing of predefined pairs of unrelated securities that are available for trading via pairs trading platform 130.

After a predefined pair is selected and a corresponding pairs trade order is opened, the trade order may be routed, at step 306, to a pairs order book for orders received in connection with the predefined pair selected. For example, the securities GLD and SPY may be provided as a predefined pair identified as "GLDSPY" and, upon selection, may be routed to a pairs order book provided for receiving orders relating to GLDSPY. Although the trade order is comprised of legs representative of each of the underlying securities in the predefined pair, it is received by the corresponding pairs order book as a single trade order (i.e., not separate orders for each leg in the pair).

Once the pairs trade order is entered into the corresponding pairs order book, an attempt may then be made, at step 308, to match order parameters associated with each leg of the paired securities. In one embodiment, pairs trading platform 130 may attempt to match order parameters for each leg of the paired securities using other pairs trade orders in the pairs order book meeting the order parameters. In another embodiment, pairs trading platform 130 may attempt to match order parameters through order books corresponding to the security represented by each leg in the pair.

A determination may be made, at step 310, to ascertain whether order parameters of both legs are met. If, and only if, order parameters associated with each leg of the paired securities are met, then may the pairs trade order be filled, at step 316, thereby making a pairs trade order transaction riskless from an execution standpoint. If, however, order parameters associated with either leg of the paired securities are not met, then a determination may be made, at step 312, to ascertain whether a time limit for conducting the pairs trade has expired. If the time period has not expired, pairs trading platform 130 may continue to attempt, at step 308, matching the pairs trade order. If the time period has expired and the pairs trade order is not filled, the pairs trade order may be canceled, at step 314.

It should be noted that the sequence of operations described in conjunction with methods 200 and 300 may be different from that illustrated, respectively, in corresponding FIGS. 2 and 3. For example, the operations at step 208 may be executed before the operations at step 206, as illustrated in method 200 of FIG. 2.

Figure 4:
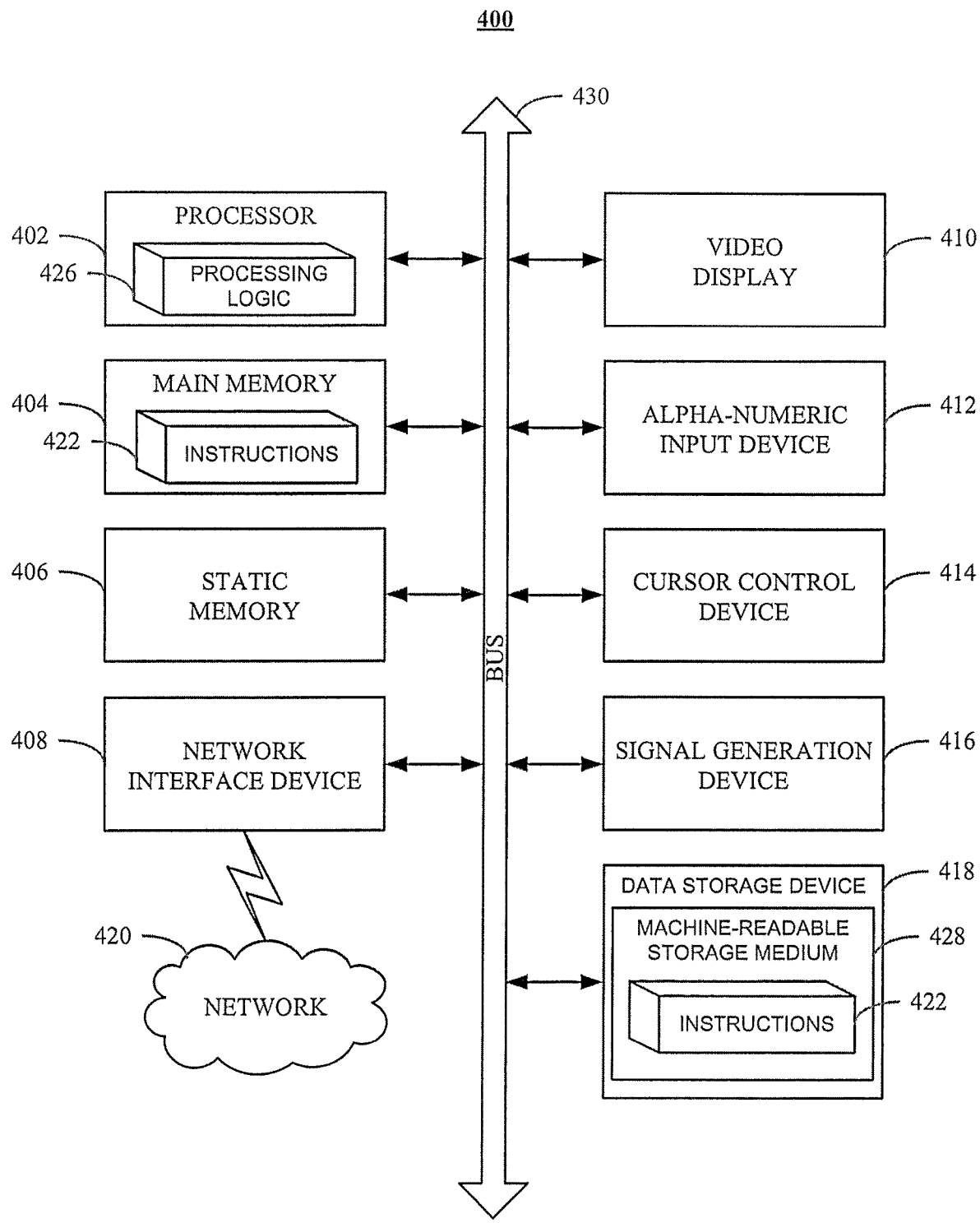
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in die capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 may be comprised of a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute processing logic 426 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 428 having one or more sets of instructions (e.g., software 422) embodying any one or more of the methodologies of functions described herein. For example, software 422 may store instructions to conduct a cash equities pairs trade. Software 422 may also reside, completely or at least partially, within main memory 404 and/or within processing device 402 during execution thereof by computer system 400; main memory 404 and processing device 402 also constituting machine-readable storage media. Software 422 may further be transmitted or received over a network 420 via network interface device 408.

Machine-readable storage medium 428 may also be used to store instructions to conduct a cash equities pairs trade. While machine-readable storage medium 428 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of die present disclosure. The term "machine-readable storage medium" shall accordingly be taken to include, but not be limited to, solid-state memories, and optical and magnetic media.

Whereas many alterations and modifications of the present disclosure will no doubt become apparent to a person of ordinary skill in the art after having read the foregoing description, it is to be understood that any particular embodiment described and shown by way of illustration is in no way intended to be considered limiting. Therefore, references to details of various embodiments are not intended to limit the scope of the claims, which in themselves recite only those features regarded as the disclosure.

The invention claimed is:

1. A computer-implemented method comprising:
   in a computer system comprising a pairing module, a trading engine module, an order books module and at least one database structure, the at least one database structure defining a plurality of order books and storing data defining predefined pairs of unrelated securities as single orders in the plurality of order books:
monitoring, by the pairing module, market-driven data;
defining, by the pairing module based on the monitoring, at least one of investor demand and trading patterns;
automatically generating, by the pairing module based on the defining, a list of predefined pairs of unrelated securities;
determining, by the pairing module, that each of the predefined pairs in the list comprises two securities that are tradeable by the trading engine module;
displaying, by a display device of a remote computing device, the list of predefined pairs of unrelated securities in a searchable and selectable format;
receiving, via an input device of the remote computing device, user input comprising a request to combine a first proposed leg and a second proposed leg of unrelated securities associated with different asset classes, the requested combination absent from the presented list of predefined pairs;
receiving, by the pairing module, the requested combination from the remote computing device over a communications interface;
creating, by the pairing module, a new pair based on the requested combination and assigning a unique identifier to the new pair;
modifying, by the display device of the remote computing device, the displayed list of predefined pairs to include the new pair in the searchable and selectable format;
creating, by the pairing module, a pairs trade order corresponding to the new pair, the pairs trade order including the unique identifier;
routing, by the trading engine module, the pairs trade order to the order books module;
storing, by the order books module, the pairs trade order as a single data entry into a corresponding order book, from among the plurality of order books, associated with the selection, the pairs trade order having order parameters, a portion of the order parameters associated with the first proposed leg, another portion of the order parameters associated with the second proposed leg;
automatically searching the plurality of order books, by the trading engine module, for both information corresponding to the first proposed leg and information corresponding to the second proposed leg, in other trade order data entries received from one or more external systems to associate with the order parameters retrieved from the corresponding order book; and
causing, by the trading engine module, a programmed computer to execute, as a single electronic transaction involving both the first proposed leg and the second proposed leg, the pairs trade order when the information corresponding to the first proposed leg and the information corresponding to the second proposed leg is located in the other trade order data entries and associated with order parameters of the first proposed leg and the second proposed leg.

2. The computer-implemented method of claim 1, wherein the pairs trade order is executed when the order parameters associated with each of said first proposed leg and said second proposed leg are matched using the information corresponding to the first proposed leg and the information corresponding to the second proposed leg in the other trade order data entries, said other trade order data entries being stored separately in order books corresponding to each of underlying securities represented in the pairs trade order.

3. The computer-implemented method of claim 1, wherein the pairs trade order is executed when the order parameters associated with each of said first proposed leg and said second proposed leg are matched using other pairs trade orders received in said order book.

4. A computer system comprising:
a computer device comprising a memory component and a processing component coupled to said memory component, the memory component storing computer-readable instructions, the processing component executing the computer-readable instructions to cause the computer device to define:
a pairing module,
a trading engine module,
an order books module, and
at least one database structure defining a plurality of order books and storing data defining predefined pairs of unrelated securities as single orders the plurality of order books;
said computer-readable instructions, when executed, further causing the computer device to:
monitor, by the pairing module, market-driven data;
define, by the pairing module based on the monitor, at least one of investor demand and trading patterns;
automatically generate, by the pairing module, a list of predefined pairs of unrelated securities based on the define;
determine, by the pairing module, that each of the predefined pairs in the list comprises two securities that are tradeable by the trading engine module;
display, on a display device of a remote computer device, the list of pre-defined pairs of unrelated securities in a searchable and selectable format;
receive, via an input device of the remote computer device, user input comprising a request to combine a first proposed leg and a second proposed leg of unrelated securities associated with different asset classes, the requested combination absent from the presented list of predefined pairs;
receive, by the pairing module, the requested combination from the remote computing device over a communications interface;
create, by the pairing module, a new pair based on the requested combination and assign a unique identifier to the new pair;
modify, by the display device of the remote computing device, the displayed list of predefined pairs to include the new pair in the searchable and selectable format;
create, by the pairing module, a pairs trade order corresponding to the new pair, the pairs trade order including the unique identifier;
route, by the trading engine module, the pairs trade order to the order books module;
store, by the order books module, the pairs trade order as a single data entry into a corresponding order book, from among the plurality of order books, associated with the selection, the pairs trade order having order parameters, a portion of the order parameters associated with the first proposed leg, another portion of the order parameters associated with the second proposed leg;
automatically search, by the trading engine module, the plurality of order books for both information corresponding to the first proposed leg and information corresponding to the second proposed leg in other trade order data entries received from one or more external systems to associate with the order parameters retrieved from the corresponding order book; and cause, by the trading engine module, a programed computer to execute, as a single electronic transaction involving both the first proposed leg and the second proposed leg, the pairs trade order when the information corresponding to the first proposed leg and the information corresponding to the second proposed leg is located in the other trade order data entries and associated with order parameters of the first proposed leg and the second proposed leg.

5. The computer-implemented method of claim 1, wherein the trading engine module is configured to automatically and continually attempt to associate the order parameters for a predetermined time period.

6. The computer-implemented method of claim 5, wherein the trading engine module is configured to cause the programmed computer to terminate the pairs trade order after the predetermined time period when the pairs trade order is not filled.

\* \* \* \* \*